United States Patent [19]

Prohaska et al.

[11] 4,224,832
[45] Sep. 30, 1980

[54] ELECTROMOTIVE POWER BRAKE

[75] Inventors: Hans Prohaska, Bietigheim-Bissingen; Karl-Heinz Theurer, Marbach, both of Fed. Rep. of Germany

[73] Assignee: ITT Industries, Inc., New York, N.Y.

[21] Appl. No.: 961,421

[22] Filed: Nov. 16, 1978

[30] Foreign Application Priority Data

Dec. 29, 1977 [DE] Fed. Rep. of Germany ....... 2758644

[51] Int. Cl.² ............................................. F16H 35/00
[52] U.S. Cl. .................................. 74/388 R; 60/545; 74/512; 303/3
[58] Field of Search ................ 74/388, 203, 207, 208, 74/512, 516, 625; 188/355, 360; 60/545; 303/3

[56] References Cited

U.S. PATENT DOCUMENTS

| | | | |
|---|---|---|---|
| 2,251,267 | 8/1941 | Carlbom | 74/516 |
| 2,884,803 | 5/1959 | Willis | 74/512 |
| 3,972,190 | 8/1976 | Sawyer | 74/512 X |

FOREIGN PATENT DOCUMENTS

| | | |
|---|---|---|
| 2064788 | 1/1972 | Fed. Rep. of Germany . |
| 439882 | 12/1935 | United Kingdom . |
| 481608 | 3/1938 | United Kingdom . |
| 490793 | 8/1938 | United Kingdom . |
| 884982 | 12/1961 | United Kingdom . |

*Primary Examiner*—C. J. Husar
*Assistant Examiner*—Conrad Berman
*Attorney, Agent, or Firm*—John T. O'Halloran; Alfred C. Hill

[57] ABSTRACT

The power brake includes an electric motor to provide braking power assistance actuated by a brake pedal and a transmission means interconnecting the brake pedal, the motor and a master cylinder piston, the transmission means being actuated by the brake pedal and having a frictional coupling to actuate the master cylinder piston, the friction of the frictional coupling increasing in proportion to the brake pedal pressure.

13 Claims, 3 Drawing Figures

ELECTROMOTIVE POWER BRAKE

Background of the Invention

This invention relates to a device for braking of motor vehicles by a brake pedal, a brake actuated thereby and an electromotive drive for brake power assistance.

Modern motor vehicles are increasingly equipped with so-called power-assisted brake systems which build up a sufficiently high braking pressure when only a weak pressure is applied to the brake pedal. In many cases, the underpressure in the intake manifold of the vehicle engine is used for this brake power assistance which, however, is not so easily attainable for diesel-engined vehicles.

From the German Patent No. DT-OS 2,064,788 a braking system is already known in which a brake cable is stretched manually or by means of an electric motor, the brake cable directly acting on a friction disc fastened to the rear axle of the motor vehicle in a manner such that the friction disc is protected against twisting. This brake with electromotive brake power assistance is provided for big trucks in addition to the normal drum brakes. The brake power of these usual drum brakes is thereby not intensified.

Summary of the Invention

An object of the present invention is to provide a device for braking of motor vehicles in which the brake power of the available drum or disc brake is intensified.

Another object of the present invention is that the device is designed in such a way that it can be installed into any motor vehicle at a later time.

A feature of the present invention is the provision of an electromotive power brake comprising: an electric motor actuated by a brake pedal, the motor providing braking power assistance; a master cylinder having a tappet push rod connected to a master cylinder piston; and transmission means interconnecting the brake pedal, the motor and the tappet push rod, the transmission means having a frictional coupling to actuate the tappet push rod, the friction of the coupling increasing in proportion to the brake pedal pressure.

It is thereby essential that the electric motor mechanically acts on the brake pedal or also on a tappet push rod of a brake master cylinder of a motor vehicle coupled with the brake pedal, whereby the power of this device is derived from the pressure applied to the brake pedal by the driver.

The mechanical transmission of motion from the electric motor to the brake pedal must be designed in such a way that also in case of a defect of the auxiliary drive a further functioning of the brake in ensured.

Brief Description of the Drawing

Above-mentioned and other features and objects of this invention will become more apparent by reference to the following description taken in conjunction with the accompanying drawing, in which.

Description of the Preferred Embodiment

Figure 1:
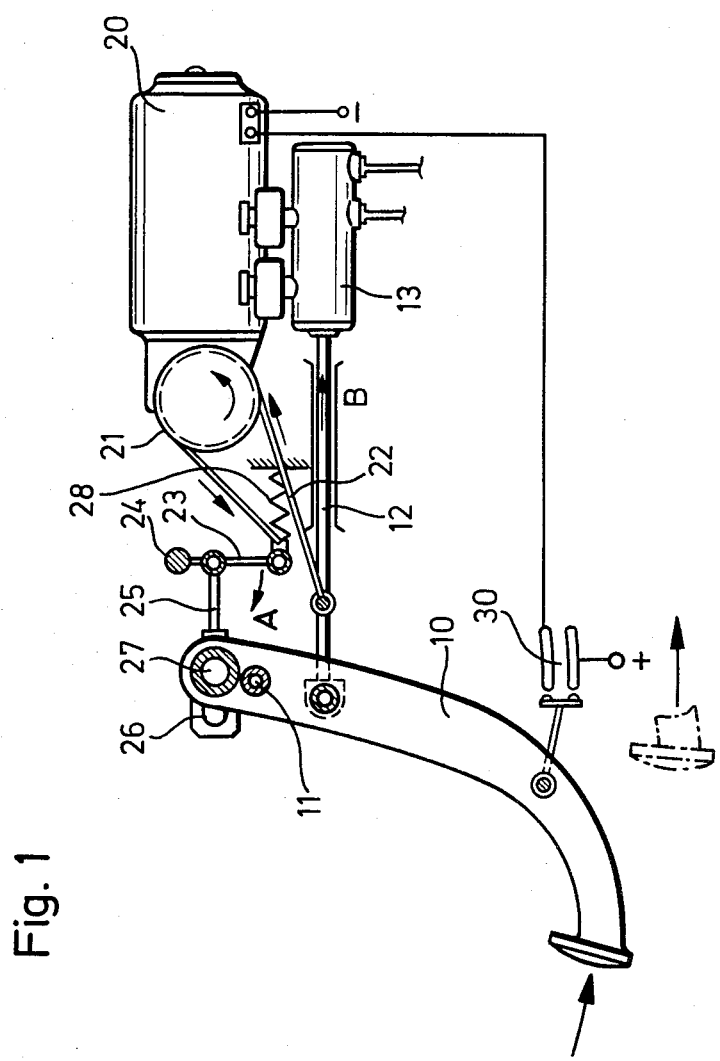
FIG. 1 is a schematic view of a first embodiment of the device in accordance with the principles of the present invention comprising a friction disc and a skid band.

In FIG. 1 a brake pedal is designated by 10. Brake pedal 10 is mounted so that it swivels at 11. To the brake pedal 10 a tappet push rod 12 is attached for actuating a piston in a brake master cylinder 13. The actual brake system is not shown in detail, because it corresponds to the usual ones.

An electric motor 20 serves for the brake power assistance. Electric motor 20 drives a friction disc 21 through a suitable speed reduction gear in the direction of rotation shown. A skid band 22 cooperates with friction disc 21. One end of skid band 22 is fixed to tappet push rod 12 and its other end to a tensioning lever 23. Tensioning lever 23 is swivelled round the point of rotation 24 by a push rod 25. Push rod 25 has a broader portion with a slot 26 which engages a cam 27 fixed to brake pedal 10. Tensioning lever 23 is acted upon by a spring element 28 which has a tendency to swivel tensioning lever 23 in such a way that the forcelocking connection between friction disc 21 and skid band 22 is released.

Electric motor 20 is connected to a voltage source (not shown) via a switch 30 as soon as brake pedal 10 is actuated. Upon actuation of brake pedal 10 a low brake pressure is built up at first in brake master cylinder 13 via tappet push rod 12. Simultaneously, electric motor 20 is energized. Cam 27 is displaced in slot 26 of push rod 25, which at first has not any influence. Thus, the brake pressure is not assisted at the beginning of the braking process.

When, however, brake pedal 10 is pressed such that push rod 25 and thereby tensioning lever 23 is displaced in direction of arrow A against the force of spring element 28, skid band 22 is stretched. The torque of electric motor 20 is now transmitted to skid band 22 by friction disc 21. Tappet push rod 12 is displaced in the direction of arrow B and, thus, the brake pressure in brake master cylinder 13 is intensified. Thus, skid band 22 and friction disc 21 form a forcelocking coupling, whereby the frictional connection depends on the pressure applied to brake pedal 10. The coupling via skid band 22 and friction disc 21 is acting only in one direction, that is from electric motor 20 to tappet push rod 12 and, hence, to brake pedal 10.

This arrangement ensures that tappet push rod 12 can also be actuated without any handicap when electric motor 20 is defective and friction disc 21 is blocked. In this embodiment it is furthermore essential that electric motor 20 starts before its torque intensifies the brake system. The reason is that because of slot 26 the lever transmission of levers 25 and 23 has a certain clearance. Besides spring element 28 is important which, when the brake pedal is reset, adjusts tensioning lever 23 in a way that the frictional connection between friction disc 21 and skid band 22 is released and, thus, does not act against the setting back of tappet push rod 12 via the still running electric motor 20.

Figure 2:
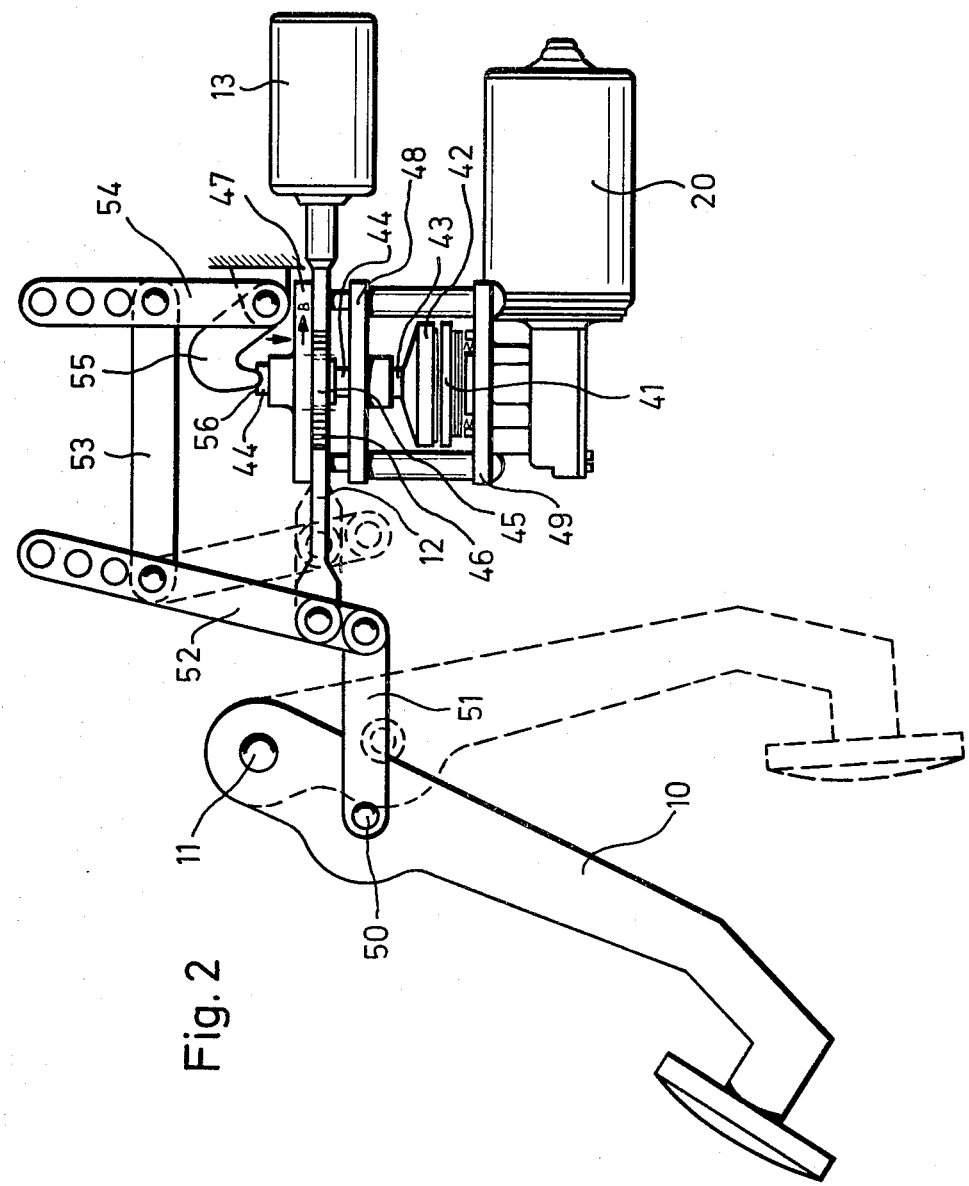
FIG. 2 is a schematic view of a second embodiment of the device in accordance with the principles of the present invention comprising friction discs being axially adjustable towards each other.

In the embodiment of FIG. 2, electric motor 20 drives a friction disc 41 which cooperates with a second friction disc 42. A shaft 44 with a pinion 45 is coupled with friction disc 42 via an overrunning-clutch drive 43. The pinion 45 cooperates with a toothed rack 46 which simultaneously serves as a tappet push rod for actuating a piston in brake master cylinder 13. The two friction discs 41 and 42 working as a coupling are axially adjustable towards each other. All these parts are held in a bearing cage having two drive end shields 47 and 48 and a mounting plate 49 all bolted to each other.

A four-bar mechanism including the levers 51, 52, 53 and 54 is attached to a pivot 50 on brake pedal 10. A driven rocking arm 55 is connected with lever 54 in a manner that prevents its twisting. Driven rocking arm 55 is designed in such a way that it presses on the front side of shaft 44. Thus the circular movement of pivot 50 via the four-bar mechanism is transformed into an axial movement of shaft 44 and thereby via the overrunning-clutch drive 43 into an axial movement of friction disc 42.

Figure 3:
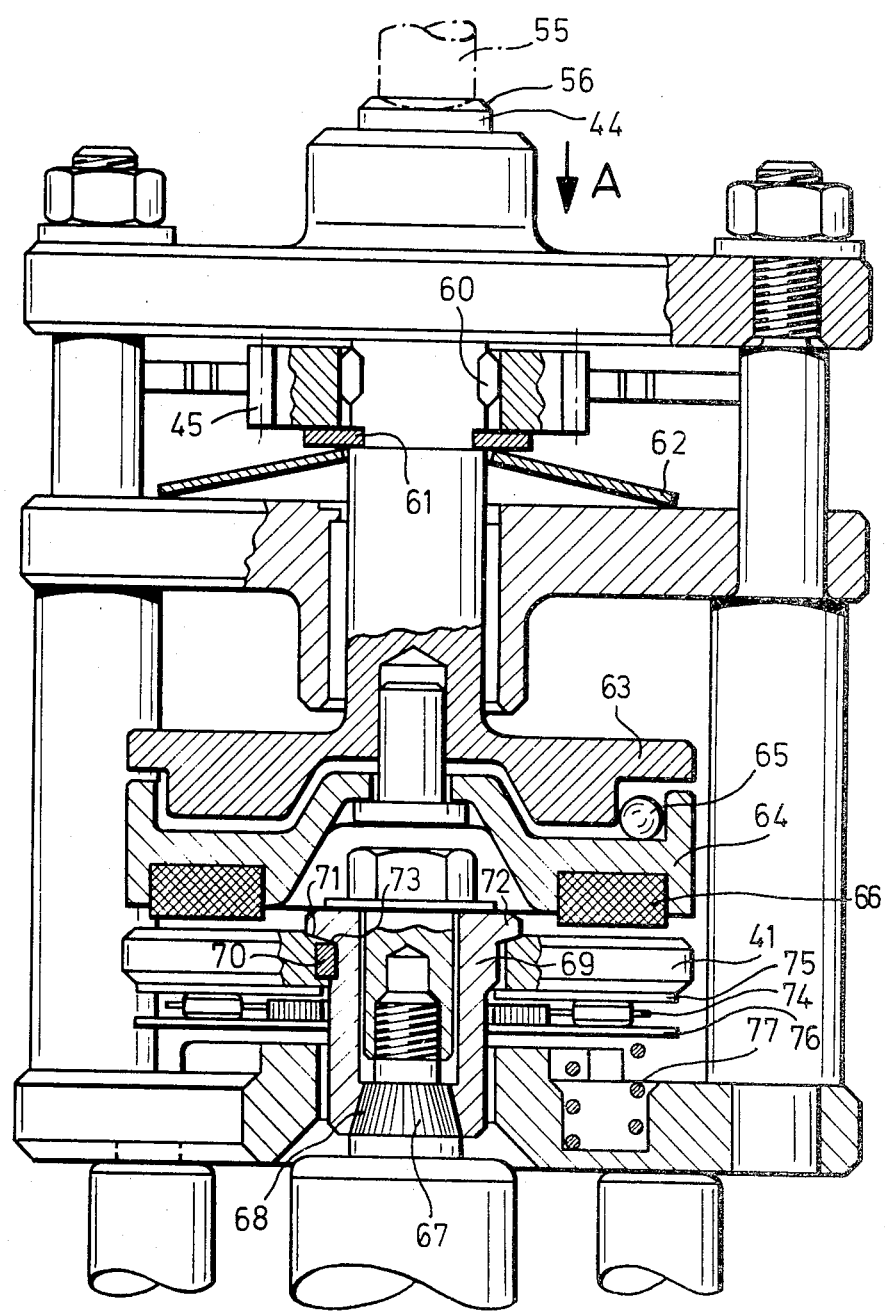
FIG. 3 is a detail of the embodiment according to FIG. 2 on an enlarged scale.

With reference to FIG. 3 some details of the design are described below.

The shaft 44 via the drive key 60 is fastened to pinion 45 in a manner that prevents its twisting. A cup spring 62 supports on a Seeger circlip ring 61, cup spring 62 having the tendency to press shaft 44 upwards. A driven pulley 63 of a usual overrunning-clutch drive 43 is formed in one piece on shaft 44. The drive disc of the overrunning-clutch drive is designated by 64, the freewheel balls by 65. Drive disc 64 simultaneously serves as friction disc 42. Drive disc 64 has a friction lining 66. The driven shaft 67 of electric motor 20 has a taper serration at 68. A bushing 69 with an internal toothing is axially put on driven shaft 67 and fastened by means of a screw connection. Bushing 69 is coupled with the other friction disc 41 via drive keys 70 in a manner that prevents its twisting. Friction disc 41 is movably supported on bushing 69 via a kind of cup bearing. For this purpose one front side of friction disc 41 is provided with a ball socket 71 and bushing 69 has radially projecting flanges 72 with an adapted ball radius which is indicated at 73. Friction disc 41 is supported on mounting plate 49 via a needle bearing with rolls 74 between two steel discs 75 and 76 and several pressure springs 77.

The device according to FIGS. 2 and 3 operates as follows: Upon actuation of brake pedal 10 at first the electric motor 20 is started. However, there does not yet exist a frictional connection between friction discs 41 and 42, because friction disc 42 is pressed upwards by the cup spring 62 opposite to the direction of arrow A. When the brake pedal is pressed stronger driven rocking arm 55 is swivelled via the lever transmission of levers 51, 52, 53 and 54 and thereby presses shaft 44 and, thus, friction disc 42 against the tension of cup spring 62 in the direction of arrow A. The frictional connection between friction discs 41 and 42 is connected and thereby pinion 45 via overrunning-clutch drive 43 is turned round in one direction of rotation, so that toothed rack 46 is adjusted in direction of arrow B. The brake pressure in the brake master cylinder is thereby increased. Again the frictional connection between friction discs 41 and 42 is increased as the adjusting angle of brake pedal 10 is increased. This arrangement is different than that of FIG. 1, since coupling 41 is acting in both directions of rotation. Nevertheless toothed rack 46 can also be adjusted, when the electric motor is blocked, because between frictional disc 42 and pinion 45 overrunning-clutch drive 43 is interposed in the pertinent direction of rotation.

It can be seen from the descriptions that such a power brake system can easily be installed into motor vehicles at a later time, because it represents a compact constructional unit. Thus, only slight changes have to be made at the tappet push rod and at the brake pedal for attaching the lever transmission mechanism.

While we have described above the principles of our invention in connection with specific apparatus it is to be clearly understood that this description is made only by way of example and not as a limitation to the scope of our invention as set forth in the objects thereof and in the accompanying claims.

We claim:

1. An electromotive power brake comprising:
   an electric motor actuated by a brake pedal, said motor providing braking power assistance;
   a master cylinder having a tappet push rod connected to a master cylinder piston; and
   transmission means interconnecting said brake pedal, said motor and said tappet push rod, said transmission means having a frictional coupling to actuate said tappet push rod, the friction of said coupling increasing in proportion to the brake pedal pressure.

2. A power brake according to claim 1, wherein said coupling only acts in one direction from said motor to said brake pedal.

3. A power brake according to claim 2, wherein said coupling includes
   a friction disc directly driven by said motor, and
   a skid band embracing said friction disc and having one end coupled to said brake pedal and the other end coupled to said tappet push rod.

4. A power brake according to claim 3, wherein said transmission means further includes
   a push rod element attached to said brake pedal; and
   a tensioning lever connected to and swivelled by said push rod element about a point of rotation;
   said one end of said skid band being coupled to said tensioning lever, said tensioning lever stretching said skid band towards said friction disc.

5. A power brake according to claim 4, wherein said transmission means further includes
   a spring element connected to said tensioning lever to reset said tensioning lever.

6. A power brake according to claim 5, wherein said transmission means further includes
   a cam disposed in said brake pedal and a slot in said push rod element.

7. A power brake according to claim 1, wherein said transmission means further includes
   lever transmission means interconnecting said brake pedal and said coupling.

8. A power brake according to claim 1, wherein said coupling acts in both directions of rotation, and said transmission means further includes
   an overrunning-clutch drive disposed between said coupling and both of said brake pedal and said tappet push rod.

9. A power brake according to claim 8, wherein said coupling includes
   a first friction disc driven by said motor, and
   a second friction disc connected to said overrunning-clutch drive,
   said overrunning-clutch drive driving a pinion fixed to a shaft, said pinion mating with a toothed rack attached to said brake pedal and said tappet push rod,
   said first and second friction discs being axially movable towards each other.

10. A power brake according to claim 9, wherein said transmission means further includes
   a pivot disposed in said brake pedal; and
   a five-lever transmission mechanism interconnecting said pivot and said shaft to translate circular motion at said pivot to straight-line motion at said shaft.
11. A power brake according to claim 10, wherein said five-lever transmission mechanism includes a driven rocking arm acting on the adjacent end of said shaft.
12. A power brake according to claim 11, wherein said toothed rack is attached to one lever of said transmission mechanism and said tappet push rod.
13. A power brake according to claim 12, wherein said first friction disc is secured to a driving shaft of said motor by a cup bearing.

* * * * *